United States Patent [19]

Kindt et al.

[11] 4,133,691

[45] Jan. 9, 1979

[54] PROCESS FOR PREPARING INORGANIC FOAM MATERIALS

[75] Inventors: Lawrence J. Kindt; James M. Gaidis, both of Ellicott City, Md.

[73] Assignee: W. R. Grace & Co., New York, N.Y.

[21] Appl. No.: 870,273

[22] Filed: Jan. 18, 1978

[51] Int. Cl.$^2$ ............................................. C04B 21/02
[52] U.S. Cl. ....................................................... 106/75
[58] Field of Search ........................................... 106/75

[56] References Cited

U.S. PATENT DOCUMENTS

| | | | |
|---|---|---|---|
| 2,664,405 | 12/1953 | Andersen et al. | 106/75 |
| 3,396,112 | 8/1968 | Burrows | 106/75 |
| 3,700,470 | 10/1972 | Barton | 106/75 |
| 3,784,385 | 1/1974 | Nekrasov et al. | 106/75 |

*Primary Examiner*—James Poer
*Attorney, Agent, or Firm*—Howard J. Troffkin; W. W. McDowell, Jr.

[57] ABSTRACT

An inorganic foam formed by initially mixing particulate aluminum with an aqueous solution of an alkali metal base for a time sufficient to at least initially cause the formation of hydrogen gases therefrom, folding the mixture into an aqueous alkali metal silicate solution in a manner to substantially retain concentrated areas of the mixture in the silicate solution for a time sufficient to allow a substantial amount of the theoretical hydrogen gas to form, then thoroughly mixing the materials to form a solid inorganic foam.

8 Claims, No Drawings

PROCESS FOR PREPARING INORGANIC FOAM MATERIALS

BACKGROUND OF THE INVENTION

The present invention relates to the formation of substantially low density inorganic foams having good compressive strength and cell structure which renders them suitable for insulating and structural utility.

Inorganic foams, especially those formed from alkali metal silicates, are known fire-resistant materials which have excellent insulation properties. The thermal conductivity of these foams compares favorably with foams made of polystyrene or of polyurethane. Further, such foams are resistant to decomposition by exposure to high temperatures, moisture or a combination thereof. The desirability of utilizing inorganic foams, especially those formed from alkali metal silicates, as a structural insulation is well documented.

Although extensive work has been previously done in attempts to form desirable silicate foams, these attempts have generally resulted in processes requiring certain parameters which cause the resultant foam to be economically uncompetitive with other insulating materials presently in the marketplace.

For example, U.S. Pat. No. 3,396,112 to Burrows discloses the formation of silicate foam by mixing dry, particulate alkali metal silicate with aluminum powder and subsequently contacting the mixtures with water. This process and those which similarly use dry starting materials, are unsuitable for commercialization because the starting materials are expensive and the amount of dry aluminum powder required renders the finished product economically prohibitive.

U.S. Pat. No. 3,700,470 to Barton attempts to overcome the economic barrier of using large amounts of dry aluminum powder by producing light weight foamed materials from dry starting components which are admixed with a substantial amount of a ceramic filler. Although this process is economically more competitive, it still requires the utilization of a dry alkali metal silicate which causes increased cost of the raw materials used.

The utilization of the less expensive commercially available aqueous solutions of alkali metal silicate, such as water glass solutions, have been attempted without substantial success. Such solutions contain dissolved silicon oxide which forms a protective coating on the surface of aluminum and thereby renders the aluminum inert to attack and unable to generate hydrogen gas. Presently known processes which use water glass solutions require the additional utilization of a blowing agent to produce a foamed object. Further, foams produced in this manner have a high degree of unreacted aluminum in the resultant product which may cause them to have inferior strength. Although the strength of these foams have been increased by the incorporation of various additives into the starting material the use of such additives and of a blowing agent add to the cost of producing a product which must compete in a cost conscious market.

SUMMARY OF THE INVENTION

Applicants herein disclose a novel process for forming inorganic silicate foams which has the substantial advantages of utilizing low cost raw materials with self-generation of a blowing agent to form a foam having desirable physical properties.

The present invention is directed to a process of forming alumina silicate foams having desirable physical properties by initially contacting particulate aluminum with an aqueous basic solution formed from a base selected from an alkali metal oxide, an alkali metal hydroxide or an alkali metal aluminate or mixtures thereof for a sufficient time to initiate generation of hydrogen gas therein, folding the aluminum-base mixture into an aqueous solution of an alkali metal silicate in a manner which substantially retains concentrated areas of the mixture in the silicate solution for a time sufficient to generate at least about 10 percent of the theoretical hydrogen gas of said mixture and then thoroughly mixing said materials until they set and subsequently recover the resultant solid inorganic foam.

DETAILED DESCRIPTION OF THE INVENTION

The present invention is directed to the formation of alumina silicate foam compositions having good physical properties of porosity, compressive strength and density. The present invention utilizes raw materials in the most economic form and amounts and, thus, produces a product which is economically competitive with insulating materials presently in the marketplace. The process requires the utilization of an aqueous solution of an alkali metal or ammonium silicate, an aqueous solution of a base selected from an alkali metal hydroxide, an alkali metal oxide or an alkali metal aluminate, and particulate aluminum.

The aqueous solution of the alkali metal silicate can be formed from any desired water-soluble alkali metal silicate or ammonia silicate or mixtures thereof. Sodium or potassium silicate are the preferred compounds, as they produce foams with excellent strength, water resistance and density when formed according to the presently disclosed process. The alkali metal silicates can be any commercially available material having an alkali metal oxide to silicon oxide mole ratio in the range of from about 1:1 to 1:4 with materials having the ratio of from about 1:2 to 1:3.5 being preferred. Sodium and potassium silicates are preferred because of the economic effectiveness, although other water soluble alkali metal silicates, such as lithium silicate, can be used.

The aqueous solution of the alkali metal silicate can be formed by any known manner, such as by dissolving dry alkali metal silicate in water or by utilizing commercially available aqueous solutions of the alkali metal silicates, such as water glass solutions, in which the alkali metal oxide to silicon oxide is in a mole ratio of from about 1:1 to about 1:4 and preferably from about 1:2 to 1:3.5. The utilization of the commercially available solutions is preferred, as it is substantially less expensive and is ready for utilization in the novel process of the present invention without further handling. The alkali metal silicates should be present in the aqueous solution in concentrations of from at least 25 weight percent of the solution up to the saturation point of the solution which is subject to the solubility of the particular alkali metal silicate being used. It is preferable that the alkali metal silicate be present in the solution in a concentrated form. Therefore, concentrations ranging from 35 weight percent to the saturation point of the solution are preferred.

The alkali metal silicate solutions used in the present process may be at temperatures of from about ambient temperature to about 40 degrees C., preferably about 30 degrees C. It is preferred that the solution be at an elevated temperature in order to effect a faster rate of reaction. Elevated temperatures above that disclosed herein may, in some instances, cause the formation of a gaseous blowing agent at too rapid a rate to permit the formation of a satisfactory foam therefrom.

The process of the present invention employs a basic solution formed from a base material which can be any water soluble alkali metal oxide or alkali metal hydroxide or an alkali metal aluminate which is basic, that is, has a metal oxide to aluminum oxide molar ratio of greater than one. It is preferable that the alkali metal of these base materials be the same as the alkali metal of the alkali metal silicate used in the particular process. The alkali metals of sodium or potassium are preferred with sodium being mose preferred.

The aluminum used in the present invention should be in the form of metallic aluminum particles. Generally the aluminum should be of particulate form capable of passing through a U.S. Standard sieve of about 200 mesh, and preferably through a sieve of about 325 mesh. The surface area of the aluminum particles is generally from about 1 to 10 m$^2$/gm. The amount of aluminum utilized in combination with the other ingredients should be sufficient to produce a volume of hydrogen gas which is at least 100 percent of that required to produce a foam having a desired pore volume, and, therefore, a density of less than 20 pounds per cubic foot and preferably from about 5 to 15 pounds per cubic foot. This can be readily determined from the amounts and densities of the silicate, base and aluminum used. For example, when the metallic aluminum is mixed with a base solution formed from an alkali metal (M) hydroxide or oxide, the materials will produce hydrogen according to the following formula:

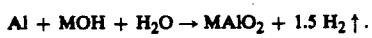

$$Al + MOH + H_2O \rightarrow MAlO_2 + 1.5\, H_2 \uparrow.$$

It is preferred that the amount of aluminum utilized be sufficient to generate at least a 10 to 100 percent excess of the hydrogen gas than is necessary to form a foam of the desired density. This is particularly true when the foam is made on a batchwise basis, as it is realized that a certain amount of the hydrogen will escape from the mixture of the solutions without aiding in the formation of a porous material.

Great excesses of aluminum powder, especially in the metallic state, should not be utilized when attempting to form foams in the most economical manner. Where additional amounts of aluminum are desired in the resultant foam, one can incorporate alumina as an added component to either the silicate or to the basic solution.

It has been presently found that one can obtain inorganic silicate foams having good strength, density and porosity properties without the aid of additional additives and without the aid of an externally produced blowing agent by initially mixing the particulate aluminum with the base solution for a time sufficient to permit the initial formation of hydrogen gas therefrom. This initial mixing has also been found to permit the aluminum particles to be substantially coated with the base material and, therefore, to be active hydrogen generating materials. The initial mixing of the aluminum with the base solution normally requires a resident time of the aluminum in the base solution of less than about five seconds. When very short mixing time between the aluminum poder and the base is desired, the mixing can be performed by simultaneously introducing the base and aluminum as a single feed stream directly into the silicate solution.

The aluminum-base solution which is a dispersion of aluminum particles, as described hereinabove, in a base solution, as described hereinabove, is then folded into or mixed with the alkali metal silicate solution in a manner which substantially retains concentrated areas of the aluminum-base mixture in the silicate solution. Depending on the mixing vessel, this can be visibly observed as a ribbon of aluminum particles in the silicate solution. The folding in of the aluminum base mixture into the silicate solution should not be done with a degree of agitation which assures a rapid uniform distribution of the aluminum-base mixture throughout the silicate solution. The particular modes of causing this desired mixing are well known to those skilled in the art of mixing materials.

The mixing of the aqueous solutions of alkali metal silicate, base and aluminum cause an exothermic reaction which is sufficient to evaporate substantially all of the excess water present. The amount of water of each of the aqueous solutions should be kept to a minimum quantity in order to permit the formation of a substantially dry product. The amount of water should, though, be of a sufficient amount to permit mixing of the materials according to the present aqueous process, as discussed hereinbelow. When the foam produced therefrom contains small amounts of moisture, it can be heated to dry off the excess water present. This drying and postcuring can be generally achieved by heating the foam to temperatures of about 100 to 200 degrees C. Although more elevated temperatures may be used, they have not been found to cause any additional improvement in the resultant foam.

It is believed, although it is not meant to be a limitation of the present process, that the presently disclosed process is capable of forming inorganic silicate foams of suitable properties because the silicon oxide present in the silicate solution is not permitted to effectively produce a protective coating on the surface of the aluminum particles to render the particles inactive with respect to the abovedescribed hydrogen generating action.

Inorganic foam compositions can be prepared by the economical and simplified process of the present invention. The process comprises the mixing of the aluminum particles with the alkali metal base solution, folding the formed mixture into a silicate solution in a manner to cause the mixture to be substantially retained in concentrated areas for a period of time to permit the formation of hydrogen gas therefrom. It is preferred that the mixture be retained in concentrated areas for as long as possible prior to the setting up and curing of the composition. Once the mixture has been introduced into the silicate solution, the solution starts to coagulate or thicken up to a point where it does not appreciably flow. The foam material thus changes from a frothy liquid or paste to a resilient gell and finally to a solid foam. The paste composition can be readily fabricated by conventional methods known to those skilled in the art, such as extrusion, molding, pouring or spraying, into desired insulating or structural shapes. The completely cured foams can be broken up into aggregate materials which can be used for insulating purposes or can be fused into desired foam cell structures by treating the foam with small amounts of adhesive, such as a silicate solution.

The process of the present invention further permits the utilization of aluminum powder in combination with alumina and/or sodium aluminate as the feed to supply the aluminum component of the foam product. In this manner, one balances the amount of the relatively costly raw material, aluminum metal powder, with that of less costly materials. The aluminum acts as the precursor for the in situ formation of the hydrogen gas blowing agent. Further, the aluminate, similar to the other bases discussed hereinabove, initially forms a coating over the aluminum particles to permit them to retain their activity once introduced into the silicate solution.

The silicate foam compositions can be formed according to the presently disclosed process utilizing particulate aluminum metal in an amount sufficient to generate at least 100 percent, and preferably an excess of 10 to 100 percent, of the gas required to form a foam of the desired chemistry as discussed hereinabove. The amount of each of the components used, based on a molar equivalent of metallic aluminum, should be from about 0.8 to about 3 moles of base, that is, free base capable of yielding a molar equivalent of hydroxyl. The exact amount can be readily determined by those skilled in the art based on the amount of gaseous product required to form a foam of desired density. Further, the amount of alkali metal silicate should be sufficient to cause the resultant foam to have a molar ratio of $SiO_2$ to $Al_2O_3$ of from about 1:1 to 10:1 and preferably from 2:1 to 5:1 with a molar ratio of about 3:1 being most preferred. The $Al_2O_3$ in the resultant product is that formed from the metallic aluminum and from any additional alumina introduced as alkali metal aluminate and/or alumina powder as described hereinabove. Alumina powder should be used as a starting component, when desired, in amounts which cause the resultant foam to have the desired silica-alumina molar ratio of about 1:1 to 10:1.

If desired, one can include other desired ingredients into the foam composition by incorporating these ingredients into the silicate solution prior to its contact with the aluminum base mixture. Such optional ingredients may include surfactants and/or viscosifiers. The surfactants may be any anionic, cationic or nonionic surfactant as are well known to those skilled in the art. Nonionic or anionic surfactants are preferred, such as ethylene oxide alcohols and the like. The viscosifiers may include, for example, cellulose gum, poly(ethylene oxide), or clay. Natural gums such as Xanthan gum and gum arabic may also be used.

The following examples are given for illustrative purposes only and are not meant to limit the invention except as defined by the claims set forth hereinbelow. All parts and percentages are by weight except where otherwise indicated.

EXAMPLE I

An aqueous base solution was formed by dissolving 10 parts of sodium aluminate in 30 parts of water and was initially rapidly mixed with 2 parts pigment grade powdered aluminum metal. Gas bubbles ($H_2$) started to form after a short period of time. The formed mixture was added to a commercially available sodium silicate solution which had 80 parts sodium silicate ($Na_2O:SiO_2$ in ratio of 1:3.2) in 120 parts of water. While gently stirring the solution, the aluminum-base mixture was poured into the silicate solution close to the periphery of the vessel containing the solution. A concentrated ribbon of aluminum-base mixture could be visibly observed in the silicate solution. The frothing solution was stirred until it became extremely viscous (about 1 minute) and then it was allowed to set. The foam was oven dried at 200 degrees C. for 24 hours. The resultant foam was observed to have good pore distribution, compressive strength and had a density of about 240 gm/l.

EXAMPLE II

A foam was formed in the same manner as described in Example I above, except that the amount of sodium aluminate was reduced to 7 parts. The resultant mixture was introduced into the silicate solution as described above.

The resultant foam product was oven dried at 200 degrees C. for 24 hours and was observed to have good pore distribution, compressive strength and had a resultant density of about 225 gm/l.

EXAMPLE III

A foam was formed in the same manner as described in Example I above except that 3 parts of aluminum metal powder were introduced into the sodium aluminate solution.

The resultant foam was oven dried at 200 degrees C. for 24 hours and was observed to have good pore distribution, compressive strength and had a density of about 275 gm/l.

EXAMPLE IV

A foam is produced in the same manner as described in Example I above except that potassium silicate and potassium aluminate are used. The metallic aluminum powder, when mixed with the aluminate solution, emits $H_2$ gas after about 5 seconds. The formed mixture is folded into the silicate solution as described in Example I and permitted to set into a foam. The resultant foam has properties similar to the foam made according to Example I.

EXAMPLE V

Foams were produced by initially mixing metallic aluminum powder of pigment grade (passes through 200 mesh U.S. Standard sieve) with an aqueous solution of sodium hydroxide. The mixture was immediately introduced into a slowly stirred 40 percent water glass solution ($Na_2O:SiO_2 = 1:3.2$). A concentrated "ribbon" of aluminum-base solution is visible throughout the water glass solution. The solution began to vigorously froth, gelled and set to hard foams having the properties indicated in Table I below.

TABLE I

| Example | Water Glass | Al | NaOH/$H_2O$ | Product Density gm/l | Strength |
|---|---|---|---|---|---|
| | | Parts by weight | | | |
| V | 50 | 8 | — | Poor Foam: | Al unreacted |
| VI | 50 | 2 | 3/3 | 416 | Good |
| VII | 50 | 3 | 4.50/4.50 | 352 | Good |
| VIII | 50 | 3.50 | 5.25/5.25 | 112 | Fair |
| IX | 50 | 3.25 | 4.90/4.90 | 176 | Fair |
| X | 50 | 3.10 | 4.70/4.70 | 128 | Fair |

TABLE I-continued

| Example | Water Glass | Al NaOH/H$_2$O Parts by weight | | Product Density gm/l | Strength |
|---|---|---|---|---|---|
| XI | 50 | 2.75 | 4.10/4.10 | 112 | Good |
| XII | 50[1] | 2.75 | 4.50/4.50 | — | Good |
| XIII | 50[2] | 3.50 | 4.50/4.50 | — | Good |
| XIV | 50[3] | 2.75 | 4.50/4.50 | — | Good |

[1] Contained 0.6 part surfactant (R(CH$_2$)$_n$S(CH$_2$)$_n$N$^+$(CH$_3$)$_2$ · RCOO$^-$)
[2] Contained 1 part gum Arabic viscosifier
[3] Contained 0.9 part Latol 28 - a tall oil surfactant, and 0.5 part Xanthan gum viscosifier

EXAMPLE XV

Foams were produced from the formulations of Examples V to XIV described above, except that the sodium hydroxide solution and the aluminum powder were simultaneously added to the water glass solution (Na$_2$O:SiO$_2$ = 1:3.2) in a manner that the aluminum powder was entrained in the sodium hydroxide solution as it was slowly mixed into the water glass.

The foams thus produced had similar properties to those of Examples V to XIV above.

While the invention has been described in connection with certain preferred embodiments, it is not intended to limit the invention to the particular forms set forth, but, on the contrary, it is intended to cover such alternatives, modifications and equivalents as defined by the appended claims.

What is claimed is:

1. A process for preparing an inorganic foam comprising:
   mixing particulate metallic aluminum with an aqueous basic solution formed from a water soluble base selected from an alkali metal oxide, alkali metal hydroxide or alkali metal aluminate or mixtures thereof for a time sufficient to form an Al/base mixture and to initiate the formation of hydrogen therefrom; said aluminum and base being present in an amount to cause the formation of sufficient gas to produce said foam;
   folding in the Al/base mixture into a separate aqueous alkali metal silicate solution at from about ambient temperatures to 40° C. and in a manner to substantially retain concentrated areas of said mixture in said silicate solution for a time to permit a substantial amount of hydrogen to be generated therein; and
   recovering an inorganic foam, said foam having a silica to alumina molar ratio of from about 1:1 to 10:1.

2. The process according to claim 1 wherein the amount of base is from about 0.8 to 3 moles per mole of metallic aluminum; and the alkali metal silicate has an alkali metal oxide to silicon oxide ratio of 1:1 to 1:4.

3. The process according to claim 1 wherein the silica to alumina molar ratio is from about 2:1 to about 5:1.

4. The process according to claim 1 wherein the basic solution is formed from base material selected from an alkali metal oxide, an alkali metal hydroxide or mixtures of an alkali metal aluminate with an alkali metal oxide or hydroxide.

5. The process according to claim 1 wherein the alkali metal is sodium.

6. The process according to claim 4 wherein the alkali metal is sodium.

7. The process according to claim 1 wherein the particulate metallic aluminum and the basic solution is mixed together for up to about 5 seconds.

8. The process according to claim 1 wherein the particulate metallic aluminum is capable of passing through a 200 mesh (U.S. Standard) screen.

* * * * *